United States Patent
Lensing et al.

(10) Patent No.: US 11,708,890 B2
(45) Date of Patent: Jul. 25, 2023

(54) PLANETARY CARRIER, PLANETARY TRANSMISSION, DRIVE TRAIN AND WIND TURBINE

(71) Applicant: Flender GmbH, Bocholt (DE)

(72) Inventors: Volker Lensing, Rhede (DE); Timo Funke, Bocholt (DE); Carolin Telaar, Isselburg (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/908,687

(22) PCT Filed: Dec. 22, 2020

(86) PCT No.: PCT/EP2020/087600
§ 371 (c)(1),
(2) Date: Sep. 1, 2022

(87) PCT Pub. No.: WO2021/175484
PCT Pub. Date: Sep. 10, 2021

(65) Prior Publication Data
US 2023/0117923 A1   Apr. 20, 2023

(30) Foreign Application Priority Data
Mar. 6, 2020   (EP) .................................... 20161481

(51) Int. Cl.
*F16H 57/08*   (2006.01)
*F03D 15/00*   (2016.01)
*F16H 57/04*   (2010.01)

(52) U.S. Cl.
CPC ........... *F16H 57/082* (2013.01); *F03D 15/00* (2016.05); *F16H 57/0479* (2013.01); *F05B 2260/40311* (2013.01)

(58) Field of Classification Search
CPC .... F16H 57/082; F16H 57/0479; F03D 15/00; F05B 2260/40311
See application file for complete search history.

(56) References Cited

U.S. PATENT DOCUMENTS

| | | | |
|---|---|---|---|
| 2012/0028754 A1* | 2/2012 | Lopez | F16H 1/2809 475/331 |
| 2013/0337967 A1* | 12/2013 | Kleine-Brockhoff | F16H 57/082 475/331 |
| 2016/0334007 A1* | 11/2016 | Lang | F16H 57/082 |

FOREIGN PATENT DOCUMENTS

| | | |
|---|---|---|
| DE | 102007003676 | 7/2008 |
| DE | 102013221862 | 4/2015 |

(Continued)

OTHER PUBLICATIONS

International Search Report issued by the European Patent Office in International Application PCT/EP2020/087600 dated Mar. 26, 2021.

*Primary Examiner* — Justin Holmes
(74) *Attorney, Agent, or Firm* — Henry M. Feiereisen LLC (57) ABSTRACT

A one-piece planetary carrier includes first and second side walls connected to one another by a plurality of webs. At least one of the webs has a curved outer surface which is directed substantially outward in a radial direction and belongs to a lateral surface of the web. The web includes a transition to the first side wall and a transition to the second side wall. The curved outer surface is convexly curved about a first axis of curvature at the transition to the first side wall and the transition to the second side wall. The curved outer surface has at least one anticlastic region which lies in an axial central section and an axial edge section of the web, (Continued)

with a combination of the axial central section with the axial edge section substantially defining an axial dimension of the planetary carrier.

16 Claims, 6 Drawing Sheets

(56) References Cited

FOREIGN PATENT DOCUMENTS

| | | |
|---|---|---|
| DE | 102014200463 | 7/2015 |
| DE | 102014203587 | 8/2015 |
| DE | 102019127546 A1 * | 4/2021 |
| EP | 2 677 209 | 12/2013 |
| EP | 3 587 863 | 1/2020 |
| FR | 3076336 A1 * | 7/2019 ......... F16H 57/0479 |

* cited by examiner

PLANETARY CARRIER, PLANETARY TRANSMISSION, DRIVE TRAIN AND WIND TURBINE

CROSS-REFERENCES TO RELATED APPLICATIONS

This application is the U.S. National Stage of International Application No. PCT/EP2020/087600, filed Dec. 22, 2020, which designated the United States and has been published as International Publication No. WO 2021/175484 A1 and which claims the priority of European Patent Application, Serial No. 20161481.5, filed Mar. 6, 2020, pursuant to 35 U.S.C. 119(a)-(d).

BACKGROUND OF THE INVENTION

The invention relates to a planetary carrier which is suitable for use in a planetary transmission. The invention also relates to a corresponding planetary transmission and a drive train which is equipped with such a planetary transmission. The invention furthermore relates to a wind turbine which has such a drive train.

German Laid-Open Application DE 10 2014 203 587 A1 discloses a planetary carrier for a motor vehicle which comprises two planetary carrier halves mounted on one another. A first planetary carrier half has a first side wall for accommodating planetary gear pins, between which integrally formed webs are arranged. The integrally formed webs are connected to a substantially flat second side wall on a second planetary carrier half.

EP 2 677 209 A1 discloses a planetary carrier for a planetary transmission, which comprises two opposite side walls, which are connected to one another via a plurality of webs. Transitions to the side walls are formed on the webs. For weight and strength optimization, the transitions are designed as spherical cups.

EP 3 587 803 A1 discloses a multistage planetary transmission which has a first and a second transmission stage. The first and second transmission stages are each designed as planetary stages and each have a planetary carrier. In this case, the planetary carrier of the first planetary stage has at least five planetary gears.

Planetary transmissions are used in a multiplicity of technical fields, in which increasing demands are being made on them in terms of performance and economy. As a result, increasing demands are placed on the individual components of a planetary transmission, that is to say also on a planetary carrier. The underlying object of the invention is that of improving a planetary transmission in the points outlined and of providing at least one suitable component for this purpose.

SUMMARY OF THE INVENTION

The object is achieved by a planetary carrier according to the invention which has a first and a second side wall. The side walls are arranged opposite one another and are connected to one another by a plurality of webs, thus enabling rotation of the first side wall about a main axis of rotation to be transmitted to the second side wall. The web has a curved outer surface which is directed substantially outward in a radial direction and belongs to a lateral surface of the web. According to the invention, the curved outer surface is of anticlastic design in at least one region, that is to say is in the form of a saddle surface. The curved outer surface of the web is thus designed to be curved in opposite directions about two separate axes of curvature. An anticlastically curved outer surface on the web offers a high degree of mechanical strength with reduced use of material, i.e. reduced weight. The anticlastically curved outer surface makes it possible to form the web with increased radii. In this case, the radii can be of constant or variable design. This makes it possible to avoid shapes with small radii which can cause increased mechanical stresses. Overall, this offers increased material utilization, which in turn implements the principle of lightweight construction. In addition, such shapes are easy to remove from the mold, permitting simple and economical production of the planetary carrier according to the invention, e.g. by casting.

In one embodiment of the claimed planetary carrier, the web also comprises a transition to the first and/or second side wall of the planetary carrier. Accordingly, the outer surface of the web also continues on the transition to the first and/or second side wall. At the transition to the first or second side wall, the anticlastic outer surface also offers an advantageous shape, by means of which mechanical stress increases due to constrictions on the planetary carrier are avoided. As a result, increased material utilization is also achieved on the first and second side walls of the planetary carrier, and the principle of lightweight construction is implemented.

In one embodiment of the claimed planetary carrier, the curved outer surface is designed to be convexly curved about a first axis of curvature at the transition. In this context, the term "convex" refers to a view of the planetary carrier from the outside. The first axis of curvature is aligned along a tangential direction of the planetary carrier and is thus substantially askew with respect to the main axis of rotation of the planetary carrier. The first axis of curvature thus passes through the corresponding web of the planetary carrier. Viewed in a longitudinal section, that is to say a section along the main axis of rotation of the planetary carrier, at least the transition has substantially an arcuate shape on the outer surface. Such an arcuate shape follows a stress profile on the planetary carrier which occurs between the pin eyes in the first and second side walls in correct operation. This avoids mechanical stress peaks and thus achieves a high degree of mechanical stability with reduced material outlay.

Furthermore, the curved outer surface can be designed to be concavely curved about a second axis of curvature. In this context, the term "concave" refers to a view of the planetary carrier from the outside. The second axis of curvature runs substantially parallel to the main axis of rotation of the planetary carrier. The second axis of curvature thus passes through the first and second side walls. The concavely curved outer surface at the transition follows a stress profile between the hub into the pin eye in the first or the second side wall. As a result, increased material utilization is achieved. By this measure too, mechanical stress increases are avoided, and increased material utilization is achieved.

Moreover, the curved outer surface can have different radii of curvature relative to the second axis of curvature at different axial positions, that is to say viewed along the main axis of rotation of the planetary carrier. The curved outer surface can have a first radius of curvature with respect to the second axis of curvature in at least one axial edge section of the web, that is to say in the region of the first or second side wall. In an axial central section, which is located between the axial edge sections, the curved outer surface can have a second radius of curvature with respect to the second axis of curvature. In this case, the first radius of curvature is smaller in magnitude than the second radius of curvature. As a result, there is a shape in the axial central section of the web which allows an advantageous absorption of mechanical tensile stresses. At the axial edge sections, in turn, the web and the transition follow the stress profile which occurs in the planetary carrier in correct operation. A second radius of curvature with a small magnitude furthermore permits an increased material recession at the first and second side walls without impairing the mechanical load-bearing capacity of the planetary carrier to an excessive extent. Improved material utilization is thereby achieved overall for the web, which in turn permits a weight-saving construction of the planetary carrier.

In a further embodiment of the claimed planetary carrier, the web has a substantially constant third radius of curvature about the first axis of curvature. In this case, the web merges constantly into the transition to the first or second side wall. A constant third radius of curvature with respect to the first axis of curvature can be produced in a simple manner and offers a high degree of load-bearing capacity between the first and second side walls via the corresponding web.

Furthermore, the claimed planetary carrier can be of one-piece design. For this purpose, the planetary carrier can be produced as a cast component, for example. In the case of a one-piece planetary carrier, the first side wall, the second side wall and the webs form a single component. The planetary carrier of one-piece design can further comprise at least one integrally formed hub. Alternatively, the hub on the planetary carrier can also be mounted on the first or second side wall. This can be accomplished, for example, in accordance with the solution according to as yet unpublished European Patent Application EP 19171876.6. The disclosure content of EP 19171876.6 is incorporated by reference into the present application.

A planetary carrier of one-piece design can be produced quickly and cost-effectively as a blank and requires only a minimum of further processing steps, in particular further machining operations. Furthermore, in the case of a one-piece planetary carrier, mechanical stress peaks at interfaces between different parts are avoided. In particular, the one-piece planetary carrier can be produced from a single material, at least as a blank, and therefore the material properties are substantially the same in the entire planetary carrier. The material utilization which can be achieved is thereby further enhanced. Furthermore, corresponding production processes, for example casting, are cost-effective and reliable.

Furthermore, the claimed planetary carrier can have a convex transition to a circumferential web on the curved outer surface in a region of the first and/or second side wall. In this context, a circumferential web is a section of the first or second side wall which runs substantially in the circumferential direction and lies radially next to a pin eye. On the first and second side walls, the circumferential web belongs to a toothing window which lies between two opposite pin eyes and through which at least one toothing of a planetary gear installed there projects in the assembled state. In an end view, the first or second side wall thus essentially has an encircling, undulating contour, which has an alternate concave and convex curvature. As a result of the convex transition from the web to the first or second side wall, stress peaks are avoided there too. This achieves a high degree of load-bearing capacity with low weight for the planetary carrier.

In a further embodiment of the claimed planetary carrier, at least one lubricant passage is formed in the first and/or second side wall. The lubricant passage is designed as a bore in the first and/or second side wall, for example. A lubricant passage can be designed as a radial bore or as an axial bore. In this context, the terms "axial" and "radial" refer to the main axis of rotation of the planetary carrier. Owing to the anticlastic outer surface on the web, there is a material recession at the first or second side wall. As a result, a radial bore in the first or second side wall can be of shortened design. This simplifies and accelerates the production of the radial bore. Furthermore, a lubricant passage can also be designed as an axial bore which extends through the first and/or second side wall and the web. The material recession on the first or second side wall which results from the anticlastic outer surface of the web likewise allows the axial bore to have a reduced length. By this means too, the manufacturing outlay for the axial bore, that is to say a lubricant passage, is reduced. Furthermore, at least one radial bore and one axial bore which intersect can jointly form a lubricant passage. Lubricant passages represent a structural weakening of the planetary carrier for which a sufficient load capacity reserve must be provided structurally. The anticlastic outer surface of the web offers an increased degree of mechanical load-bearing capacity which allows a plurality of lubricant passages to be formed in the planetary carrier in a simple and cost-effective manner. As a result, an improved lubricant supply can be achieved in the planetary carrier, for example for sliding bearings or planetary gears. As an alternative or in addition, a lubricant passage can have an increased diameter, making possible an increased throughput of lubricant. Overall, the anticlastic outer surface thus allows an improved lubricant supply in the planetary carrier. As a result, in turn, planetary carriers with an increased number of planetary gears are practicable.

Furthermore, the claimed planetary carrier can be designed to receive at least four planetary gears. Preferably, the planetary carrier can be designed to receive at least five, more preferably at least seven, particularly preferably ten planetary gears. The higher the number of planetary gears in a planetary carrier, the narrower are its webs and the lower is their ability to withstand mechanical stress. By virtue of the anticlastic outer surface of at least one web, an increase in mechanical load-bearing capacity is thus achieved, which in turn makes it possible to produce planetary carriers for at least five planetary gears which are compact and weight-saving. Consequently, corresponding planetary transmissions can advantageously be used, for example, in drive trains of wind turbines.

In a further embodiment of the claimed planetary carrier, it has a mass-specific torque density of from 200 Nm/kg to 1600 Nm/kg, preferably from 400 Nm/kg to 1200 Nm/kg, particularly preferably from 450 Nm/kg to 850 Nm/kg. The mass-specific torque density is the ratio of a maximum nominal torque which can be introduced into the planetary carrier as intended and the mass of the planetary carrier itself. In this case, the mass of the planetary carrier is based on a machined blank without further attachments such as, for example, planetary gear pins or planetary gears. Here, the mass of the planetary carrier also comprises the mass of the hub, which is connected to the first or second side wall. When considering the mass-specific torque density of a planetary carrier without a hub, this can be correspondingly higher. Consequently, the claimed planetary carrier offers a high degree of mechanical stability with a low weight. In the case of a planetary transmission which is to be used in a drive train of a wind turbine, this permits simplified installation on a nacelle of the wind turbine.

Furthermore, the claimed planetary carrier can have a relative planetary gear width of from 0.50 to 0.85, preferably of from 0.55 to 0.80, particularly preferably of from 0.60 to 0.75. In this context, the relative planetary gear width is understood to mean a ratio between an axial dimension of the clear space between the first and second side walls and an axial outer dimension of the planetary carrier from the first to the second side wall. Here, the axial dimension of the clear space between the first and second side walls corresponds substantially to an axial length of the axial central section of the web. The clear space between the first and second side walls substantially defines the maximum width of a planetary gear to be installed in the planetary carrier, taking into account, for example, bearings and installation tolerances. The higher the relative planetary gear width, the higher is the utilization of the available installation space in the planetary carrier. The wider a planetary gear is, in turn, the higher the torques that can be transmitted in the corresponding planetary stage. Accordingly, the claimed planetary carrier offers a high degree of compactness and an increased nominal torque. Accordingly, the claimed planetary carrier can advantageously be used in applications such as wind turbines.

In a further embodiment of the claimed planetary carrier, a toothing window is formed at least between two webs, for example between two adjacent webs. In the assembled state, a planetary gear extends in the radial direction out of the toothing window, thus enabling engagement with a ring gear to take place. A pin eye is formed in the first and/or second side wall radially inside the toothing window. A maximum planetary gear diameter is determined by a radial position of the pin eye and the shaping of the webs. In relation to the main axis of rotation of the planetary carrier, the size of the toothing window in the circumferential direction is defined by a window angle. In connection with a planetary carrier diameter, a window opening coefficient is defined by way of the window angle and the maximum planetary gear diameter. Here, the window coefficient corresponds to the equation $$F = \frac{D_{Träger} \cdot \sin\left(\frac{\alpha}{2}\right)}{D_{Planetenrad\_max}}$$

where
F:=window opening coefficient;
$D_{Träger}$:=planetary carrier diameter at the point of contact between the web and the limb of the window opening angle;
$D_{Planetenrad\_max}$:=maximum planetary gear diameter;
$\alpha$:=window angle.

In the claimed embodiment, the planetary carrier can have a window opening coefficient which is from 0.3 to 1.5, preferably from 0.4 to 1.2, particularly preferably from 0.5 to 1.0. The claimed planetary carrier thus makes it possible to utilize the clear space provided between the first and second side walls for planetary gears. Cavities which are mechanically without any function for the operation of a planetary transmission are thus avoided. Overall, this makes possible a powerful and, at the same time, compact construction of the planetary transmission belonging to the planetary carrier. The window opening coefficient should be determined in an axially central region of meshing engagement of a planetary gear.

The object on which the invention is based is also achieved by a planetary transmission according to the invention. The planetary transmission has at least one planetary stage. The planetary stage comprises a ring gear and a planetary carrier in which at least one planetary gear is rotatably arranged. The planetary transmission also has a sun gear, wherein the at least one planetary gear meshes with the sun gear and the ring gear. The planetary stage can comprise a stationary component or can comprise exclusively rotatable components. A planetary stage which comprises exclusively rotatable components can be used, for example, as a coupling stage of a coupling transmission. According to the invention, the planetary carrier is designed in accordance with one of the embodiments outlined above. The technical advantages of the planetary carrier are thus transferred to the planetary transmission according to the invention.

In one embodiment of the claimed planetary transmission, a line for lubricant can be formed on an outer side of the planetary carrier. In this case, the line for lubricant can be arranged on a web. By means of the anticlastically shaped outer surface, a space saving in the radial direction is achieved. The installation space saved in this way makes it possible to install a line there for lubricant. This makes it possible to avoid complicated bores in the planetary carrier. In particular, it is thereby possible to obtain planetary carriers of increased widths, i.e. increased axial dimensions, for which it is not possible to implement sufficiently accurate lubricant passages in the form of bores in the planetary carrier. The performance spectrum of planetary transmissions is thus expanded in a simple manner by the planetary carrier according to the invention.

The object described above is likewise achieved by the drive train according to the invention. The drive train comprises a rotor shaft, which can be driven by a rotor of a wind turbine, for example. The rotor shaft is connected in a torque-transmitting manner to a transmission, which is connected in turn in a torque-transmitting manner to a generator. According to the invention, the transmission in the drive train is designed as a planetary transmission in accordance with one of the embodiments described above.

Furthermore, the outlined object is achieved by a wind turbine according to the invention. The wind turbine comprises a rotor, which is mounted rotatably on a nacelle. The rotor is connected to a rotor shaft of a drive train, and therefore driving power is fed to the rotor shaft. According to the invention, the drive train is designed in accordance with one of the embodiments described above.

The object described is likewise achieved by the industrial application according to the invention. The industrial application comprises a drive unit, which can be designed as an electric motor, internal combustion engine or hydraulic motor, for example. The drive unit makes available a driving power, which is fed to a transmission. With conversion of the existing rotational speed and the existing torque, the driving power is fed to an output unit. The output unit can be designed, for example, as a mechanical application, for example as a mill, vertical mill, sugar mill, cement mill, rock crusher, conveyor belt, pump, roller press, apron conveyor, tube mill, rotary kiln, rotary mechanism, agitator, lifting device, refuse press or scrap press. According to the invention, the transmission via which the drive unit is connected to the output unit is designed as a planetary transmission in accordance with one of the embodiments outlined above.

BRIEF DESCRIPTION OF THE DRAWING

The invention is explained in greater detail below with reference to individual embodiments in figures. The figures should be read as complementing each other to the extent that the same reference signs in different figures have the same technical meaning. The features of the individual embodiments can also be combined with one another. Furthermore, the embodiments shown in the figures can be combined with the features outlined above. More specifically.

DETAILED DESCRIPTION OF PREFERRED EMBODIMENTS

Figure 1:
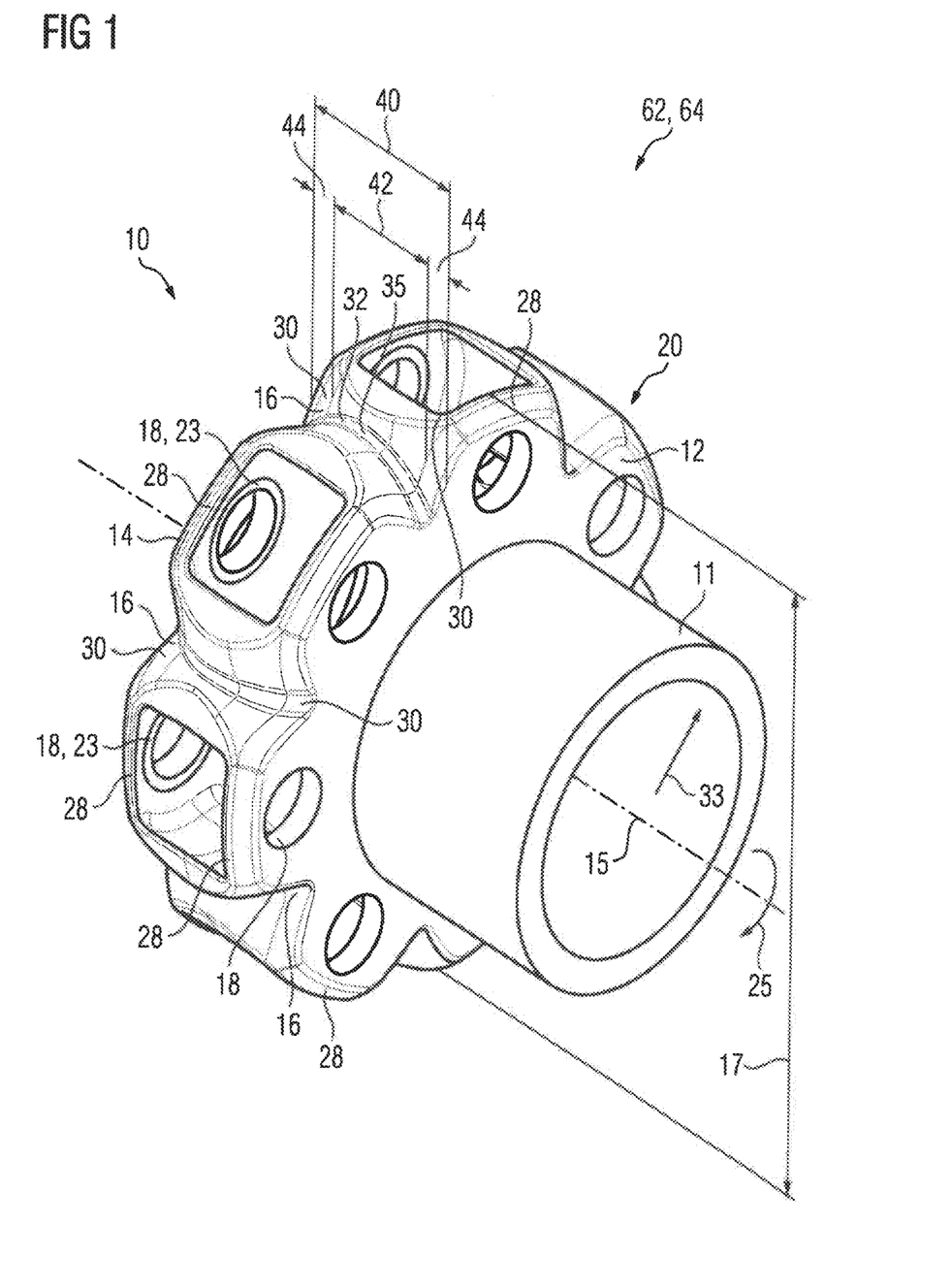
FIG. 1 schematically shows an oblique view of a first embodiment of the claimed planetary carrier.

FIG. 1 schematically illustrates a first embodiment of the claimed planetary carrier 10 in an oblique view. The planetary carrier 10 comprises a first and a second side wall 12, 14, which are arranged opposite one another along a main axis of rotation 15 of the planetary carrier 10. A planetary carrier diameter 17 is defined by the first and second side walls 12, 16. The planetary carrier 10 is of one-piece design with a hub 11, by means of which a driving power 25 can be introduced into the planetary carrier 10. The first and second side walls 12, 14 are connected to one another via a plurality of webs 16, which extend substantially in the axial direction, that is to say along the main axis of rotation 15. Between the webs 16, the first and second side walls 12, 14 each have tangential webs 28 arranged opposite one another. Adjacent to the tangential webs 28, pin eyes 18 are formed in the first and second side walls 12, 14, respectively, and are positioned in alignment and are each designed to receive planetary gear pins 23 (not illustrated specifically). The webs 16 and the tangential webs 28 form toothing windows 21. In the assembled state, toothing of planetary gears 20 (not illustrated specifically), which are to be arranged on the planetary gear pins 23, extends through the toothing windows 21. The planetary gears 20 are designed to mesh with a ring gear 62 (not illustrated specifically) and a sun gear 64 (not illustrated specifically). The planetary carrier 10 is of one-piece design, and therefore the first and second side walls 12, 14 and the webs 16 form a single component. The planetary carrier 10 can be produced at least as a blank by casting.

The webs 16 each have a region 35 which lies in an axial central section 42 and/or an axial edge section 44. A combination of the axial central section 42 with the axial edge section 44 substantially defines an axial dimension 40 of the planetary carrier 10. The webs 16 each comprise a transition 30 to the first and second side walls 12, 14 and have an outer surface 32 which substantially corresponds to a radially outwardly directed side of the web 16. A radially outer direction is illustrated in FIG. 1 by the arrow 33. In the designated region 35, the outer surface 32 of the respective web 16 is designed as a saddle surface, that is to say anticlastically.

Figure 2:
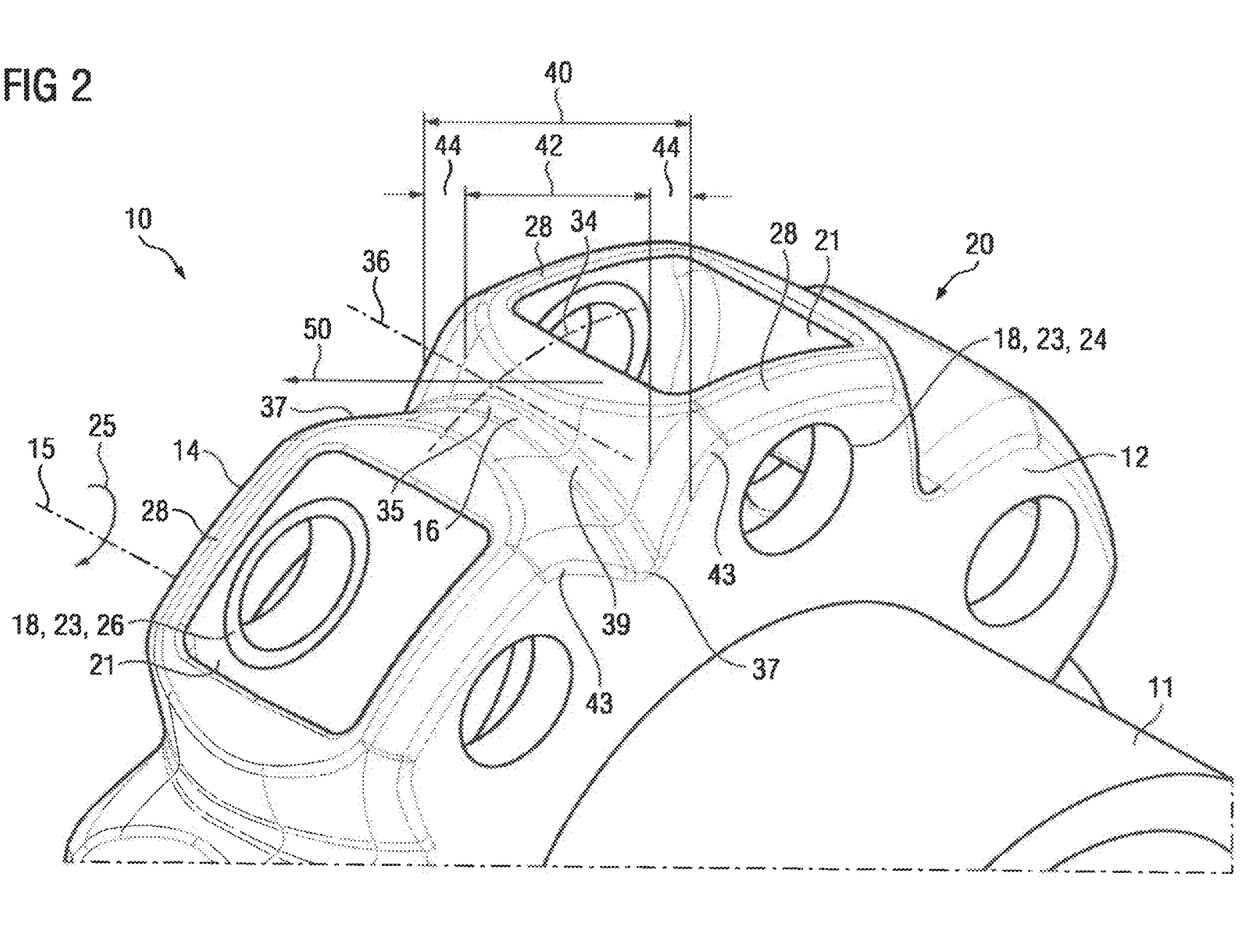
FIG. 2 schematically shows a detail view of the first embodiment of the claimed planetary carrier.

FIG. 2 shows a detail view of the first embodiment of the claimed planetary carrier 10 according to FIG. 1. Accordingly, FIG. 1 and FIG. 2 should be interpreted as complementary to one another. At least in a region 35, the outer surface 32 of the web 16 has an anticlastic shape. Accordingly, the outer surface 32 is convexly curved about a first axis of curvature 34. The first axis of curvature 34 is oriented substantially tangentially with respect to the main axis of rotation 15 of the planetary carrier 10, extends through the web 16 and follows the planetary carrier 10 in a curved manner in the circumferential direction. At least in the region 35, the outer surface 32 of the web 16 likewise has a second axis of curvature 36, about which the outer surface 32 is designed to be concavely curved. In the region of the first and second side walls 12, 14, that is to say substantially in the axial edge sections 44, the outer surface 32 has a first radius of curvature 37 about the second axis of curvature 36. Between the first and second side walls 12, 14, that is to say substantially in the axial central section 42, the outer surface 32 of the web 16 has a second radius of curvature 39 about the second axis of curvature 36. In this case, the second radius of curvature 39 is lower than the first radius of curvature 37. The first and second radii of curvature 37, 39 are viewed in the radial direction in FIG. 2. In the axial central section 42, the outer surface 32, and thus the corresponding web 16, has a shape with increased radii. As a result, in the case of a force flow 35 from a tangential web 28 on the first side wall 12 to a tangential web 28 on the second side wall 14, this is promoted in such a way that mechanical stress peaks in the web 16 are avoided. Such a force flow 35 can be produced by planetary gear pins 23, which are arranged in corresponding pin eyes 18, that is to say a first pin eye 24 on the first side wall 12, and a second pin eye 26 on the second side wall 14. In the region of the first and second side walls 12, 14, the anticlastic outer surface 32 forms a material recession 38 which leads to a weight saving on the planetary carrier 10. Furthermore, the anticlastic outer surface 32 has convex transitions 43 to the adjacent tangential webs 28. The anticlastic outer surface 32 can thus be removed easily from a casting mold, thereby simplifying production of the planetary carrier 10 by means of casting.

Figure 3:
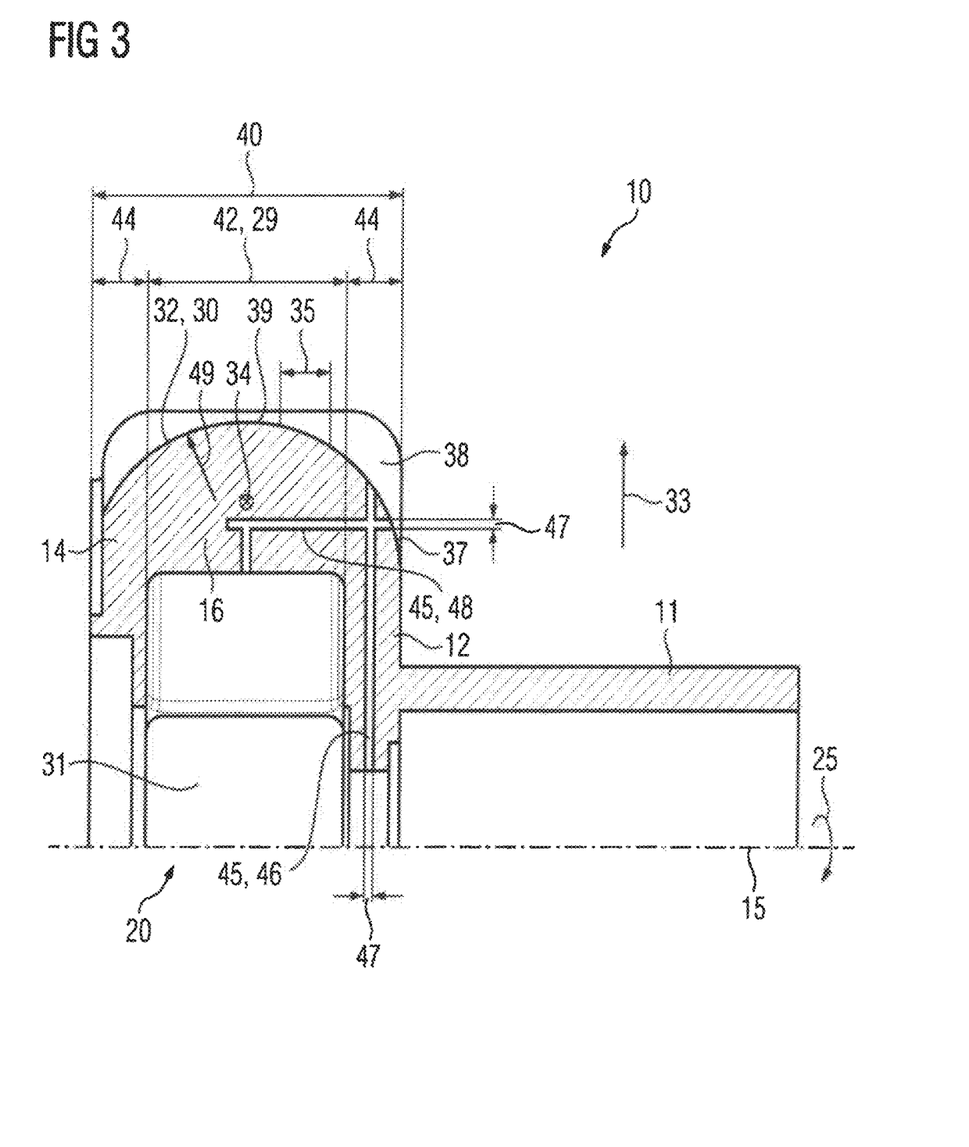
FIG. 3 shows a longitudinal section of the first embodiment of the claimed planetary carrier.

FIG. 3 schematically shows the first embodiment of the claimed planetary carrier 10 in longitudinal section. Accordingly, FIG. 1, FIG. 2 and FIG. 3 should be interpreted as complementary to one another. FIG. 3 shows one of the webs 16 which connect the first and second side walls 12, 14 of the planetary carrier 10 to one another. The planetary carrier 10, that is to say the first and second side walls 12, 14 and the web 16, are of one-piece design. At least in the region 35, the outer surface 32 of the web 16 has a convex curvature about the first axis of curvature 34, which extends into the plane of the drawing in FIG. 3. The outer surface 32 is curved about the first axis of curvature 34 from the first to the second side wall 12, 14 about a substantially constant third radius of curvature 49. The third radius of curvature 49 is designed in such a way that a material recession 38 is formed in the region of the first and second side walls 12, 14, that is to say in the axial edge regions 44 of the web 16. As a result, a weight saving is also achieved on the planetary carrier 10. Furthermore, a radial bore 46, which serves as a lubricant passage 45, is formed in the first side wall 12. As a result of the material recession 38 in the region of the first side wall 12, the radial bore 46 has a reduced length in the radial direction 33. Likewise, an axial bore 48 is formed in the web 16, which bore also serves as a lubricant passage 45 and crosses the radial bore 46 and thus forms a continuous lubricant passage 45. Owing to the anticlastic outer surface 32, an increased load-bearing capacity is achieved at the web 16. Accordingly, the web 16 offers an increased degree of load-bearing capacity which makes it possible to increase a bore diameter 47 of the radial bore 46 and/or of the axial bore 48. This makes it possible to increase the throughput of the lubricant passage 45. Furthermore, as in FIG. 3, lubricant passages 45 can be formed in a plurality of webs 16 and, as a result, an improved lubricant supply can be achieved for planetary gears 20 which are to be arranged in the planetary carrier 10. Furthermore, FIG. 3 shows the axial edge sections 44 of the web 16 on the first and second side walls 12, 14. Formed between the axial edge regions 44 is an axial central section 42 which substantially radially delimits a clear space 31 which lies between the first and second side walls 12, 14. The axial dimension 40 of the planetary carrier 10 corresponds substantially to the sum of the axial edge regions 44 and the axial central section 42. The axial central section 42 corresponds substantially to a maximum planetary gear width 29 which a planetary gear 20 to be installed in the planetary carrier 10 can have. The size of the axial central section 42 based on the axial dimension 40 of the planetary carrier 10 thus defines the relative planetary gear width of the planetary gear carrier 10. The anticlastic outer surface 32 on the webs 16 leads to increased material utilization, and therefore the planetary carrier 10 has a relative planetary gear width of from 0.50 to 0.85, preferably of from 0.55 to 0.80, particularly preferably of from 0.60 to 0.75.

Figure 4:
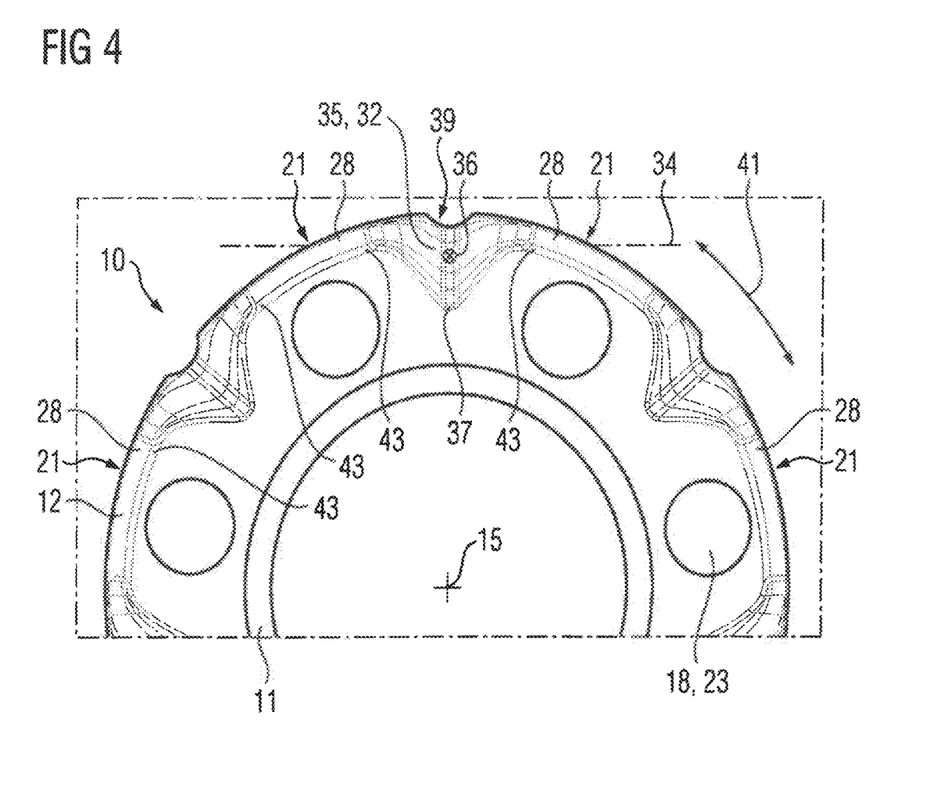
FIG. 4 shows an end view of the first embodiment of the claimed planetary carrier.

FIG. 4 shows the first embodiment of the claimed planetary carrier 10 in an end view of the first side wall 12. Accordingly, FIG. 4 should be interpreted as complementary to FIG. 1, FIG. 2 and FIG. 3. FIG. 4 shows that convex transitions to the tangential webs 28 are formed on the anticlastic outer surface 32 of the web 16. Along a circumferential direction 41 of the planetary carrier 10, the first side wall 12 thus has an end face with an undulating contour in which concavely curved outer surfaces 32 of webs 16 and convex transitions to tangential webs 28 are arranged in an alternating manner. An advantageous distribution of mechanical stresses in the region of the first side wall 12 is thereby achieved. In addition, a reduction in splash losses is also made possible.

Figure 5:
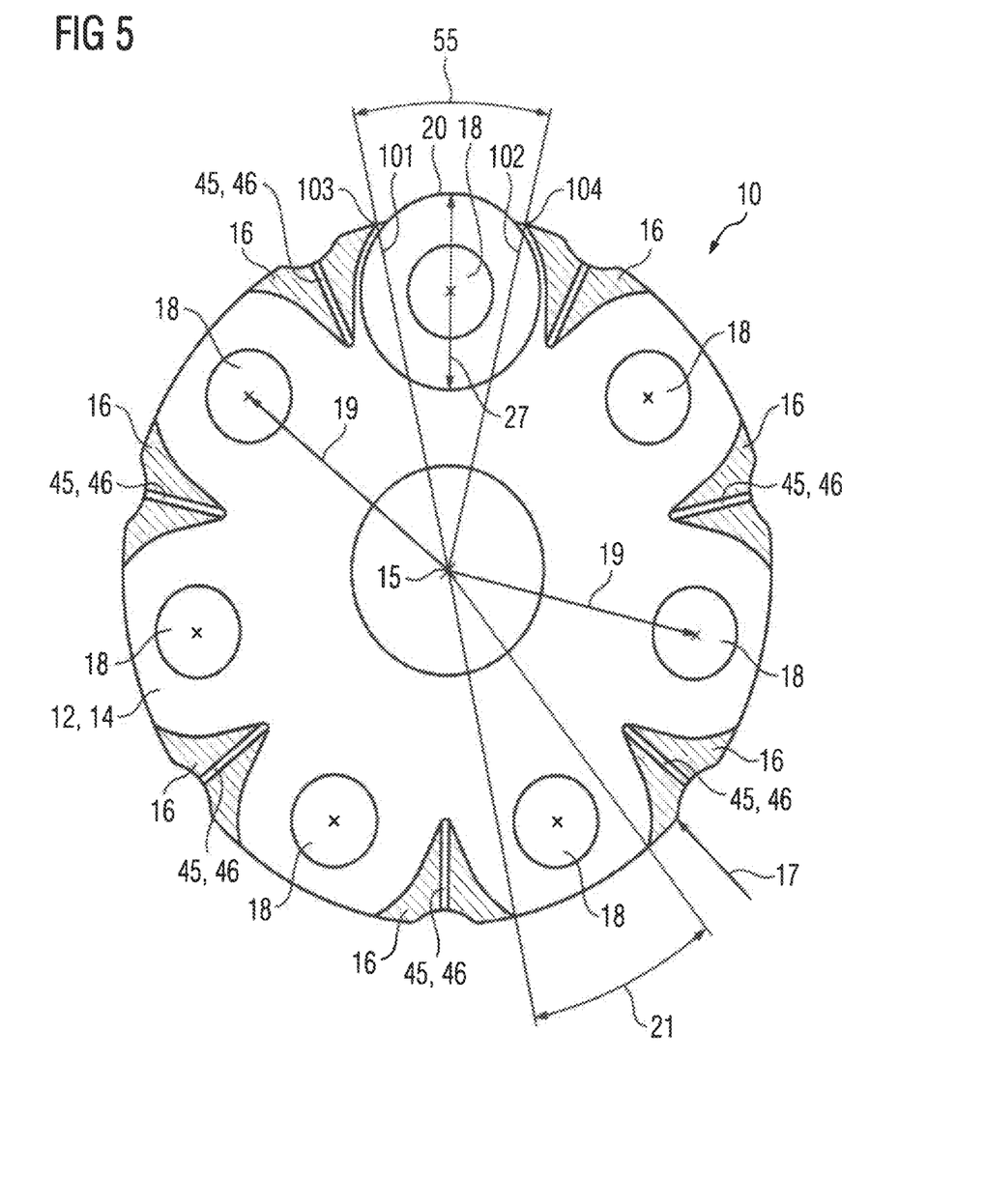
FIG. 5 shows a second embodiment of the claimed planetary carrier in cross section.

A second embodiment of the claimed planetary carrier 10 is shown in a cross section in FIG. 5. FIG. 5 shows a first or second side wall 12, 14 which is sectioned transversely to the main axis of rotation 15 in the region of the webs 16 and in which seven pin eyes 18 are formed. In FIG. 5, the section through the planetary carrier 10 is made through radial bores 46, which serve as lubricant passages 45. A toothing window 21, which has a window angle 55, is formed between each pair of adjacent webs 16. As a result of this and of a radial position 19 of the corresponding pin eye 18, a planetary gear diameter 27 is predetermined which describes the size of the largest usable planetary gear 20. The interaction between the maximum planetary gear diameter 27, the planetary carrier diameter 17 and the associated window angle 55 results in a window opening coefficient. Here, the window opening coefficient corresponds to the equation $$F = \frac{D_{Träger} \cdot \sin\left(\frac{\alpha}{2}\right)}{D_{Planetenrad\_max}}$$

where
F:=window opening coefficient;
$D_{Träger}$:=planetary carrier diameter at the point of contact between the web and the limb of the window opening angle;
$D_{Planetenrad\_max}$:=maximum planetary gear diameter;
α:=window angle.

The window opening coefficient is between 0.3 and 1.5. Increased utilization of the space made available in the planetary carrier 10 is thereby achieved. The window opening coefficient should be determined in an axially central region of meshing engagement of a planetary gear.

Figure 6:
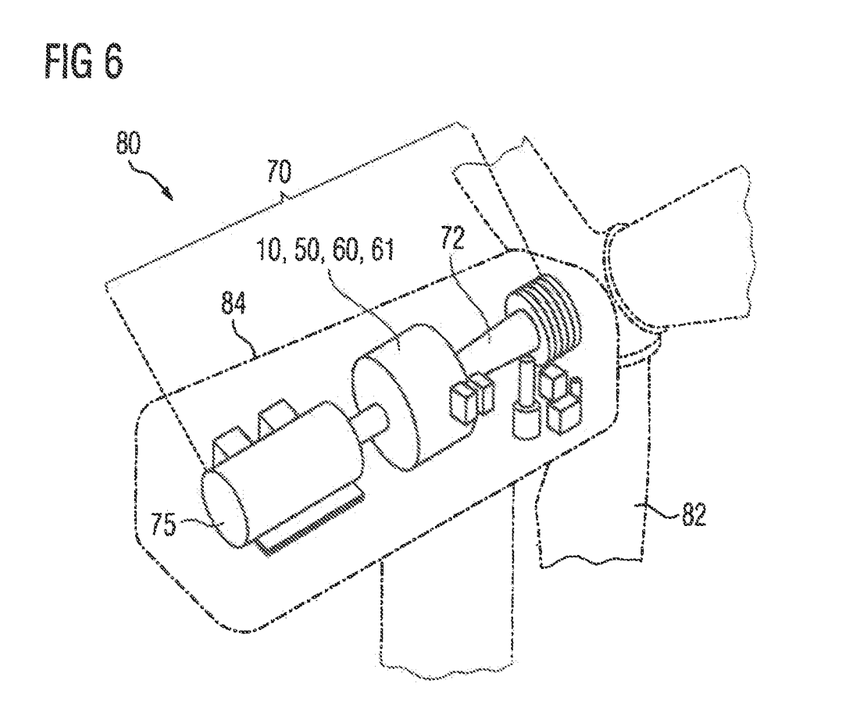
FIG. 6 shows a structure of a first embodiment of the claimed wind turbine.

Furthermore, FIG. 6 illustrates an embodiment of a claimed wind turbine 80. The wind turbine 80 has a rotor 82, which is mounted rotatably on a nacelle 84. The rotor 82 is connected to a rotor shaft 72, by means of which a generator 75 is driven via a transmission 50. The rotor shaft 72, the transmission 50 and the generator 75 belong to a drive train 70 of the wind turbine 80, which is accommodated in the nacelle 84. The transmission 50 is a planetary transmission 60 which has at least one planetary carrier 10 according to one of the embodiments illustrated above.

Figure 7:
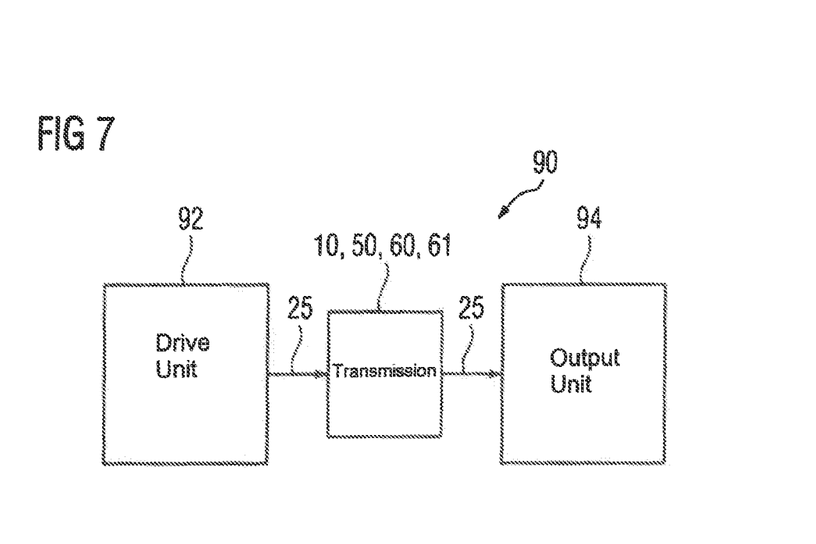
FIG. 7 shows a structure of a first embodiment of the claimed industrial application.

FIG. 7 schematically shows the structure of a claimed industrial application 90, which has a drive unit 92 and an output unit 94, which are connected to one another in a torque-transmitting manner via a transmission 50. The drive unit 92 is designed to provide a driving power 25 that is necessary for the operation of the output unit 94. For this purpose, the drive unit 92 is designed as an electric motor, as an internal combustion engine, or as a hydraulic motor, for example. The output unit 94 is designed as a mechanical application. The output unit 94 is designed accordingly, such that the industrial application 90 is a mill, vertical mill, sugar mill, cement mill, rock crusher, conveyor belt, pump, roller press, apron conveyor, tube mill, rotary kiln, rotary mechanism, agitator, lifting device, refuse press or scrap press, for example. In this case, the transmission 50 is designed as a planetary transmission 60 with at least one planetary stage 61 having a planetary carrier 10 according to one of the embodiments outlined above.

The invention claimed is:

1. A one-piece planetary carrier, comprising first and second side walls connected to one another by a plurality of webs, at least one of the webs having a curved outer surface which is directed substantially outward in a radial direction and belongs to a lateral surface of the web, said at least one of the webs comprising a transition to the first side wall and a transition to the second side wall, said curved outer surface designed to be convexly curved about a first axis of curvature at the transition to the first side wall and the transition to the second side wall, said curved outer surface having at least one anticlastic region which lies in an axial central section and an axial edge section of the at least one of the webs, with a combination of the axial central section with the axial edge section substantially defining an axial dimension of the planetary carrier.

2. The planetary carrier of claim 1, wherein the anticlastic region of the outer surface at the first side wall or the second side wall is provided by a material recession.

3. The planetary carrier of claim 1, wherein the first axis of curvature is aligned along a tangential direction of the planetary carrier.

4. The planetary carrier of claim 1, wherein the curved outer surface is designed to be concavely curved about a second axis of curvature.

5. The planetary carrier of claim 4, wherein the second axis of curvature is aligned parallel to an axis of rotation of the planetary carrier.

6. The planetary carrier of claim 4, wherein the curved outer surface has, about the second axis of curvature, in the axial edge section of the at least one of the webs, a first radius of curvature which is smaller in magnitude than a second radius of curvature in the axial central section of the at least one of the webs.

7. The planetary carrier of claim 1, wherein the at least one of the webs has a substantially constant third radius of curvature about the first axis of curvature and is designed to merge constantly into the transition to the first side wall and/or the second side wall.

8. The planetary carrier of claim 1, wherein the curved outer surface has a convex transition to a circumferential web of the first side wall and/or the second side wall.

9. The planetary carrier of claim 1, wherein at least one lubricant passage is formed in at least one of the at least one of the webs, the first side wall, and the second side wall.

10. The planetary carrier of claim 1, wherein the planetary carrier is designed to receive at least four planetary gears.

11. The planetary carrier of claim 1, wherein the planetary carrier has a mass-specific torque density of from 200 Nm/kg to 1600 Nm/kg.

12. The planetary carrier of claim 1, wherein the planetary carrier has a relative planetary gear width of from 0.50 to 0.85, with the relative planetary gear width defined by a ratio between an axial dimension of a clear space between the first and second side walls and an axial outer dimension of the planetary carrier from the first side wall to the second side wall.

13. A planetary transmission, comprising:
a planetary stage comprising a ring gear, a planetary carrier, a planetary gear received in the planetary carrier and meshing with the ring gear, and a sun gear meshing with the planetary gear, said planetary carrier designed in one piece and comprising first and second side walls connected to one another by a plurality of webs, at least one of the webs having a curved outer surface which is directed substantially outward in a radial direction and belongs to a lateral surface of the web, said at least one of the webs comprising a transition to the first side wall and a transition to the second side wall, said curved outer surface designed to be convexly curved about a first axis of curvature at the transition to the first side wall and the transition to the second side wall, said curved outer surface having at least one anticlastic region which lies in an axial central section and an axial edge section of the at least one of the webs, with a combination of the axial central section with the axial edge section substantially defining an axial dimension of the planetary carrier.

14. A drive train, comprising:
a generator;
a transmission connected in a torque-transmitting manner to the generator, said transmission designed as a planetary transmission as set forth in claim 13; and
a rotor shaft connected in a torque-transmitting manner to the transmission.

15. A wind turbine, comprising:
a nacelle;
a rotor rotatably secured on the nacelle; and
a drive train arranged in the nacelle and designed as set forth in claim 14.

16. An industrial application, comprising:
an output unit;
a transmission connected in a torque-transmitting manner to the output unit, said transmission designed as a planetary transmission as set forth in claim 12; and
a drive unit connected in a torque-transmitting manner to the transmission.

* * * * *